United States Patent
Singh et al.

(10) Patent No.: US 9,929,940 B2
(45) Date of Patent: Mar. 27, 2018

(54) UPDATE OF MAC ROUTES IN EVPN SINGLE-ACTIVE TOPOLOGY

(71) Applicant: Juniper Networks, Inc., Sunnyvale, CA (US)

(72) Inventors: Nitin Singh, Fremont, CA (US); Ryan Bickhart, San Francisco, CA (US); Manoj Sharma, Cupertino, CA (US); Hassan C. Hosseini, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 381 days.

(21) Appl. No.: 14/674,569

(22) Filed: Mar. 31, 2015

(65) Prior Publication Data

US 2016/0261487 A1 Sep. 8, 2016

Related U.S. Application Data

(60) Provisional application No. 62/128,946, filed on Mar. 5, 2015.

(51) Int. Cl.
*H04L 12/28* (2006.01)
*H04L 12/707* (2013.01)
(Continued)

(52) U.S. Cl.
CPC .......... *H04L 45/22* (2013.01); *H04L 12/4641* (2013.01); *H04L 41/0663* (2013.01);
(Continued)

(58) Field of Classification Search
CPC . H04L 12/4641; H04L 41/0663; H04L 45/22; H04L 45/28; H04L 45/66; H04L 45/70
See application file for complete search history.

(56) References Cited

U.S. PATENT DOCUMENTS 7,990,993 B1 8/2011 Ghosh et al.
8,917,729 B1 12/2014 Kumar et al.
(Continued)

OTHER PUBLICATIONS

Response to Communication pursuant to Rule 69 EPC dated Sep. 12, 2016, from counterpart European Application No. 16158415.6, filed on Mar. 7, 2017, 15 pp.
(Continued)

*Primary Examiner* — Charles C Jiang
*Assistant Examiner* — Ryan Kavleski
(74) *Attorney, Agent, or Firm* — Shumaker & Sieffert, P.A.

(57) ABSTRACT

In general, techniques are provided for described herein that extend existing Ethernet Virtual Private Network (EVPN) protocol signaling mechanisms so that local, multi-homing PEs couple to an Ethernet segment can definitively convey their primary/backup designated forwarder (DF) status to any remote PE of the EVPN. In one example, this is accomplished by utilizing a new extended community attribute to each Ethernet A-D per EVI route advertised by each of the multi-homing PEs to specifically carry the advertising PE's primary or backup status. As such, any receiving remote PE need not rely on the arrival of individual MAC routes from a new primary PE and withdrawal of MAC routes from a former primary PE to update its forwarding information.

10 Claims, 4 Drawing Sheets

(51) Int. Cl.
  *H04L 12/24* (2006.01)
  *H04L 12/703* (2013.01)
  *H04L 12/46* (2006.01)
  *H04L 12/721* (2013.01)

(52) U.S. Cl.
  CPC .............. *H04L 45/28* (2013.01); *H04L 45/66* (2013.01); *H04L 45/70* (2013.01)

(56) References Cited

U.S. PATENT DOCUMENTS

| | | | |
|---|---|---|---|
| 9,019,814 B1* | 4/2015 | Mohanty | H04L 45/00 370/219 |
| 2012/0201124 A1 | 8/2012 | Roque et al. | |
| 2013/0301472 A1* | 11/2013 | Allan | H04L 45/66 370/254 |
| 2015/0256405 A1* | 9/2015 | Janardhanan | H04L 41/12 370/255 |
| 2016/0127320 A1* | 5/2016 | Badoni | H04L 12/4641 726/12 |

OTHER PUBLICATIONS

Sajassi, et al., "BGP MPLS Based Ethernet VPN", draft-ief-l2vpn-evpn-11, Network Working Group, IETF Trust, Oct. 18, 2014, 52 pp.

Sajassi et al., "BGP MPLS-Based Ethernet VPN," RFC 7432, Internet Engineering Task Force (IETF), Feb. 2015, 56 pp.

Rabadan et al., "AC-influenced Designated Forwarder Election for (PBB-)EVPN," BESS Workgroup Internet Draft, draft-rabadan-bess-evpn-ac-df-01, Oct. 27, 2014, 13 pp.

Sajassi et al., "EVPN Virtual Ethernet Segment," Internet Working Group Internet Draft, draft-sajassi-bess-evpn-virtual-eth-segment-00, Oct. 25, 2014, 19 pp.

Extended Search Report from counterpart European Application No. 16158415.6, dated May 3, 2016, 10 pp.

Notice of Intention to Grant from counterpart European Application No. 16158415.6, dated Jun. 8, 2017, 30 pp.

* cited by examiner

UPDATE OF MAC ROUTES IN EVPN SINGLE-ACTIVE TOPOLOGY

This application claims priority from U.S. Provisional Application Ser. No. 62/128,946, filed Mar. 5, 2015, the entire content of which is incorporated herein by reference.

TECHNICAL FIELD

The invention relates to computer networks and, more specifically, to forwarding network traffic within computer networks.

BACKGROUND

A computer network is a collection of interconnected computing devices that can exchange data and share resources. Example network devices include layer two devices that operate within the second layer (L2) of the Open Systems Interconnection (OSI) reference model, i.e., the data link layer, and layer three devices that operate within the third layer (L3) of the OSI reference model, i.e., the network layer. Network devices within computer networks often include a control unit that provides control plane functionality for the network device and forwarding components for routing or switching data units.

An Ethernet Virtual Private Network (EVPN) may be used to extend two or more remote layer two (L2) customer networks through an intermediate layer three (L3) network (usually referred to as a provider network), in a transparent manner, i.e., as if the intermediate L3 network does not exist. In particular, the EVPN transports L2 communications, such as Ethernet packets or "frames," between customer networks via the intermediate network. In a typical configuration, provider edge (PE) network devices (e.g., routers and/or switches) coupled to the customer edge (CE) network devices of the customer networks define label switched paths (LSPs) (also referred to as pseudowires) within the provider network to carry encapsulated L2 communications as if these customer networks were directly attached to the same local area network (LAN). In some configurations, the PE network devices may also be connected by an IP infrastructure in which case IP/GRE tunneling or other IP tunneling can be used between the network devices.

As the PE network devices in an EVPN forward Ethernet frames, the PE network devices learn L2 state information for the L2 customer networks. The L2 state information may include media access control (MAC) addressing information for the CE network devices and customer equipment within the customer network and the physical ports of the PE network device through which the customer devices are reachable. The PE network devices typically store the MAC addressing information in L2 learning tables associated with each of their physical interfaces. When switching an individual Ethernet frame having a given destination MAC address, a PE network device typically broadcasts the Ethernet frame to all of its physical ports unless the PE network device has previously learned the specific physical port through which to the destination MAC address is reachable. In this case, the PE network device forwards a single copy of the Ethernet frame out the associated physical port.

In an EVPN, MAC learning between PE network devices occurs in the control plane rather than in the data plane (as happens with traditional bridging) using a routing protocol. For example, in EVPNs, a PE network device typically uses the Border Gateway Protocol (BGP) (i.e., an L3 routing protocol) to advertise to other provider edge network devices the MAC addresses learned from the local consumer edge network devices to which the PE network device is connected. A PE device may use BGP route advertisement message to announce reachability information for the EVPN, where the BGP route advertisement specifies one or more MAC addresses learned by the PE network device instead of L3 routing information.

In an EVPN configuration referred to as single-active mode, an Ethernet segment includes multiple PE network devices that provide multi-homed connectivity for one or more local customer network devices. Moreover, the multiple PE network device provide transport services through the intermediate network to a remote PE network device, and one of the multiple PE network devices in the Ethernet segment operates as a designated forwarder to forward Ethernet frames in the segment for the customer network device. The remaining PE network devices that provide the customer network device multi-homed connectivity in the Ethernet segment are configured as backup PE network devices. When a network failure occurs with respect to the current designated forwarder, the backup PE network devices may execute a designated forwarder election algorithm to determine which of the backup PE network devices will become the new designated forwarder and, as a result, assume responsibility for forwarding network layer two communications for the customer network device.

SUMMARY

The techniques described herein extend existing EVPN protocol signaling mechanisms so that local, multi-homing PEs coupled to an Ethernet segment can definitively convey their primary/backup status to any remote PE of the EVPN. In one example, this is accomplished by utilizing a new extended community attribute in each Ethernet A-D per EVI route advertised by each of the multi-homing PEs to specifically carry the advertising PE's primary or backup status. As such, any receiving remote PE need not rely on the arrival of individual MAC routes from a new primary PE and withdrawal of MAC routes from a former primary PE to update its forwarding state. Because the number of MAC routes whose next hops have to be repaired can be on the order of thousands (or more), conventional convergence of the network grows linearly as a function of the number of MAC routes received. Unlike the conventional techniques, convergence time for the techniques described herein is a constant time, i.e., is not a function of the number of MAC routes to be updated.

In one example, a method includes participating, with one of a plurality of multi-homed provider edge (PE) routers that provide an active-standby configuration for an Ethernet segment coupling the PE routers to a customer network, in a designated forwarder (DF) election of the PE routers for the Ethernet segment. The method further includes, upon election as the DF for the Ethernet segment, sending, with the one of the PE routers, a first control plane routing protocol message to a remote PE router, wherein the first control plane routing protocol message includes an indicator that the PE router has affirmatively been selected as a designated forwarder in the Ethernet segment.

In another example, a method includes receiving, with one of a remote router coupled by an intermediate network to a plurality of multi-homed provider edge (PE) routers that provide an active-standby configuration for an Ethernet segment coupling the PE routers to a customer network, a first control plane routing protocol message, wherein the first control plane routing protocol message includes an indicator that a first one of the plurality of PE routers has affirmatively been selected as a designated forwarder (DF) in the Ethernet segment. The method further includes receiving, with the remote router, a second control plane routing protocol message, wherein the first control plane routing protocol message includes an indicator that a first one of the plurality of PE routers has affirmatively been selected as a designated forwarder (DF) in the Ethernet segment; and updating, in accordance with the DF election and backup DF election received via the first and second control plane messages and with the remote PE, the forwarding state for all MACs associated with the {ESI, EVI} in constant time without relying on individual MAC advertisements to update the forwarding state on a MAC by MAC basis.

The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
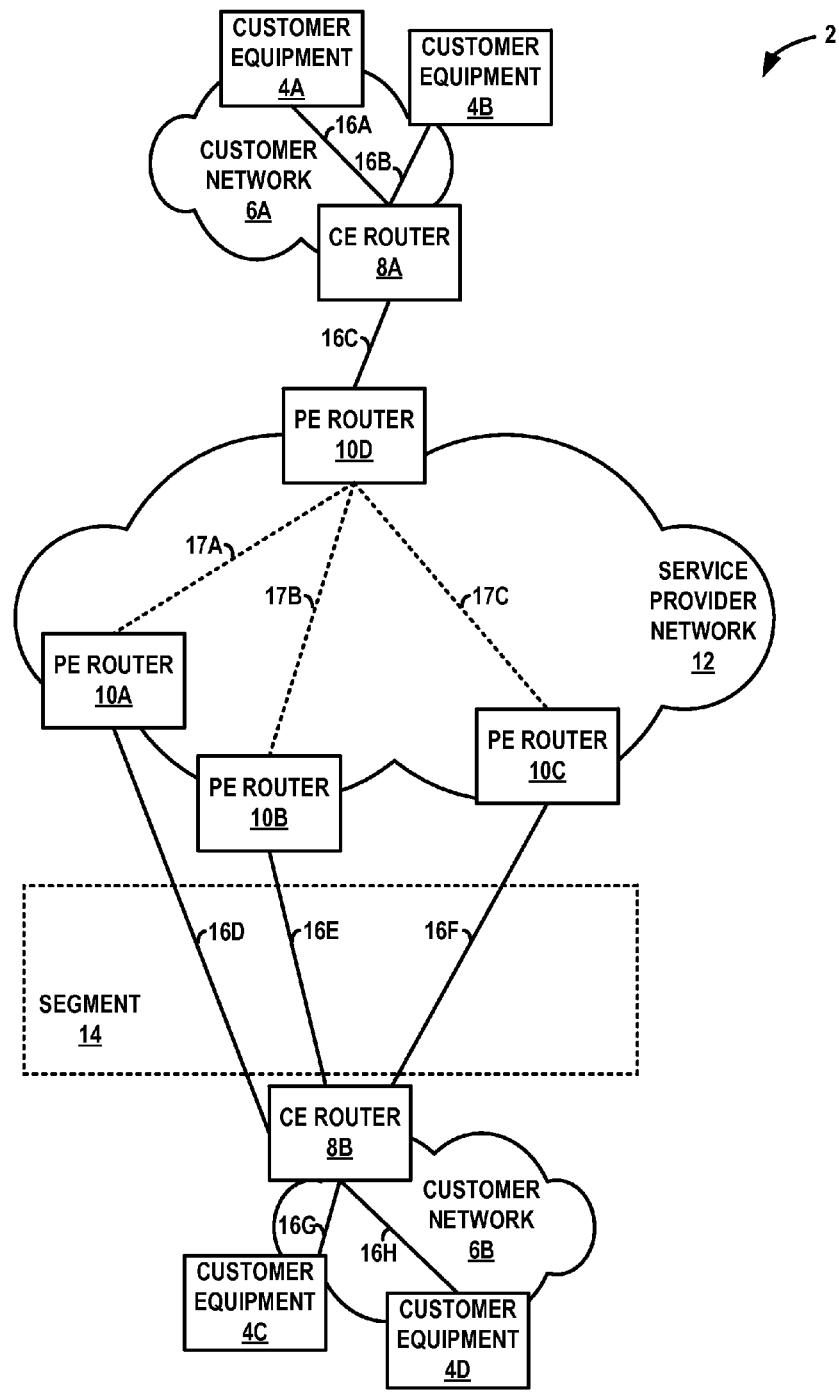
FIG. 1 is a block diagram illustrating an example system in which a first provider edge (PE) router advertises to a second, remote PE router, in advance of a network failure, that the first PE router is the next designated forwarder, in accordance with techniques of the disclosure.

FIG. 1 is a block diagram illustrating an example system. In the example of FIG. 1, PE routers 10A-10D ("PE routers 10") provide customer devices 4A-4D ("customer devices 4") associated with customer networks 6A-6B ("customer networks 6") with access to service provider network 12 via CE routers 8A-8B ("CE routers 8"). Network links 16A-16H may be Ethernet, ATM or any other suitable network connections.

PE routers 8 and CE routers 10 are illustrated as routers in the example of FIG. 1. However, techniques of the disclosure may be implemented using switches or other suitable network devices that participate in a layer two (L2) virtual private network service, such as an Ethernet Virtual Private Network (EVPN). Customer networks 6 may be networks for geographically separated sites of an enterprise. Each of customer networks 6 may include additional customer equipment 4A-4D ("customer equipment 4"), such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. The configuration of network 2 illustrated in FIG. 1 is merely exemplary. For example, an enterprise may include any number of customer networks 6. Nonetheless, for ease of description, only customer networks 6A-6B are illustrated in FIG. 1.

Service provider network 12 represents a publicly accessible computer network that is owned and operated by a service provider, which is usually large telecommunications entity or corporation. Service provider network 12 is usually a large layer three (L3) computer network, where reference to a layer followed by a number refers to a corresponding layer in the Open Systems Interconnection (OSI) model. Service provider network 12 is a L3 network in the sense that it natively supports L3 operations as described in the OSI model. Common L3 operations include those performed in accordance with L3 protocols, such as the Internet protocol (IP). L3 is also known as a "network layer" in the OSI model and the term L3 may be used interchangeably with the phrase "network layer" throughout this disclosure.

Although not illustrated, service provider network 12 may be coupled to one or more networks administered by other providers, and may thus form part of a large-scale public network infrastructure, e.g., the Internet. Consequently, customer networks 6 may be viewed as edge networks of the Internet. Service provider network 12 may provide computing devices within customer networks 6 with access to the Internet, and may allow the computing devices within the customer networks to communicate with each other. Service provider network 12 may include a variety of network devices other than PE routers 10. Although additional network devices are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of system 2 are illustrated as being directly coupled, it should be understood that one or more additional network elements may be included along any of network links 16, such that the network elements of system 2 are not directly coupled.

Service provider network 12 typically provides a number of residential and business services, including residential and business class data services (which are often referred to as "Internet services" in that these data services permit access to the collection of publically accessible networks referred to as the Internet), residential and business class telephone and/or voice services, and residential and business class television services. One such business class data service offered by service provider network 12 includes L2 EVPN service. For example, an EVPN is a service that provides a form of L2 connectivity across an intermediate L3 network, such as service provider network 12, to interconnect two L2 customer networks, such as L2 customer networks 6, that are usually located in two different geographic areas. Often, EVPN is transparent to the customer networks in that these customer networks are not aware of the intervening intermediate service provider network and instead act and operate as if these two customer networks were directly connected and formed a single L2 network. In a way, EVPN enables a form of a transparent LAN connection between two geographically distant customer sites that each operates a L2 network and, for this reason, EVPN may also be referred to as a "transparent LAN service."

To configure an EVPN, a network operator of the service provider configures various devices included within service provider network 12 that interface with L2 customer networks 6. The EVPN configuration may include an EVPN instance (EVI), which consists of one or more broadcast domains. Generally, an EVI may refer to a routing and forwarding instance on a PE router, such as PE routers 10A-10D. Consequently, multiple EVIs may be configured on PE routers 10 for Ethernet segment 14, as further described herein, each providing a separate, logical layer two (L2) forwarding domain. In this way, multiple EVIs may be configured that each includes one or more of PE routers 10A-10C of Ethernet segment 14. In some examples, Ethernet Tags are then used to identify a particular broadcast domain, e.g., a VLAN, in an EVI. A PE router may advertise a unique EVPN label per <ESI, Ethernet Tag> combination. This label assignment methodology is referred to as a per <ESI, Ethernet Tag> label assignment. Alternatively, a PE router may advertise a unique EVPN label per MAC address. In still another example, a PE router may advertise the same single EVPN label for all MAC addresses in a given EVI. This label assignment methodology is referred to as a per EVI label assignment.

In the example of FIG. 1, for use in transporting communications associated with one or more EVIs, the network operator configures PE routers 10 to provision pseudowires 17A-17C for transporting L2 communications. Pseudowires are logical network connections formed from two unidirectional label switched paths (LSPs) that emulate a connection not natively offered by service provider network 12 for consumption outside the boundaries of that service provider network 12. Pseudowires may emulate a L2 connection within service provider network 12 enabling service provider network 12 to offer emulated L2 connectivity externally for consumption by L2 customer networks 6. As such, each EVPN instance may operate over pseudowires 17 to enable a logical form of L2 connectivity between customer networks 6.

To configure an EVI, pseudowires 17 may be configured such that each of PE routers 10 that provide a given EVI is interconnected by way of pseudowires to every other one of the PE devices participating in the EVI. In the example of FIG. 1, each of PE routers 10 provides access to the EVPN for carrying traffic associated with customer networks 6 and, therefore, each of PE devices 10 within the same Ethernet segment may be connected to every other PE device 10 via pseudowires 17. Once pseudowires are configured in this manner, EVPN may be enabled within PE devices 10 to operate over the pseudowires, which may in this context operate as logical dedicated links through service provider network 12. In operation, EVPN generally involves prepending or otherwise inserting a tag and a pseudowire label onto incoming L2 packets, which may also be referred to as L2 frames (particularly in the context of Ethernet), and transmitting the tagged packets through a corresponding one of the configured pseudowires. Once EVPN is configured within service provider network 12, customer devices 4 within customer networks 6 may communicate with one another via EVPN as if they were directly connected L2 networks.

In order to establish the EVPN, an EVPN protocol executing on PE routers 10A-10C triggers EVPN designated forwarder (DF) election for Ethernet segment 14. This may be accomplished, for example, by EVPN protocol executing on each of PE routers 10A-10C that participating in the Ethernet segment directing the router to output a routing protocol message advertising an Ethernet Segment Identifier (ESI), which is typically unique across all EVPN instances (EVIs). In addition, for each EVI, the EVPN protocol directs the router to output a routing protocol message advertising an Ethernet Auto-Discovery (AD) route specifying the relevant ESI for the Ethernet segment coupled to the EVPN instance. Once the EVPN is operational for the {EVI, ESI} pair, PE routers 10A-10C output routing protocol messages to remote PE router 10D to announce media access control (MAC) addresses associated with customer equipment in customer network 6B.

For example, in typical operation, PE routers 10A-10D communicate using the Border Gateway Protocol (BGP) and the EVPN protocol specifies BGP Network Layer Reachability Information (NLRI) for the EVPN and may define different route types for conveying EVPN information via the BGP routing protocol. The EVPN NLRI is typically carried in BGP using BGP Multiprotocol Extensions. An Ethernet Segment route advertised by each PE router 10A-10C using BGP includes a Route Distinguisher and Ethernet Segment Identifier. An Ethernet AD route advertised by each PE router 10A-10C for each EVI, specifies a Route Distinguisher (RD) (e.g., an IP address of an MPLS Edge Switch (MES)), ESI, Ethernet Tag Identifier, and MPLS label. Subsequent BGP media access control (MAC) routes output by PE router 10A-10C announce MAC addresses of customer equipment 4 for the EVPN include a RD, ESI, Ethernet Tag Identifier, MAC address and MAC address length, IP address and IP address length, and MPLS label.

As such, the EVPN protocol executing on each PE router 10A-10C initiates EVPN DF election for the Ethernet segment on a per EVPN instance basis, and participates within that election for each EVPN instance. That is, DF election may be at the granularity of each ESI, EVI combination. If elected DF, one of PE routers 10A-10C elected as DF forwards traffic from the EVPN to local CE router 8B. Additional example information with respect to the EVPN protocol is described in "BGP MPLS Based Ethernet VPN," draft-ietf-l2vpn-evpn-11, Internet Engineering Task Force (IETF), Jul. 2, 2014, the entire contents of which are incorporated herein by reference.

In the example of FIG. 1, when providing the EVPN service to customer networks 6, PE routers 10 and CE routers 8 typically perform MAC address learning to efficiently forward L2 network communications in system 2. That is, as PE routers 10 and CE routers 8 forward Ethernet frames, the routers learn L2 state information for the L2 network, including MAC addressing information for customer equipment 4 within the network and the physical ports through which customer equipment 4 are reachable. PE routers 10 and CE routers 8 typically store the MAC addressing information in MAC tables associated with respective interfaces. When forwarding an individual Ethernet frame received on one interface, a router typically broadcasts the Ethernet frame to all other interfaces associated with the EVPN unless the router has previously learned the specific interface through which the destination MAC address specified in the Ethernet frame is reachable. In this case, the router forwards a single copy of the Ethernet frame out the associated interface.

Moreover, as PE routers 10 learn the MAC address for customer equipment 4 reachable through local attachment circuits, the PE routers 10 utilize MAC address route advertisements of a layer three (L3) routing protocol (i.e., BGP in this example) to share the learned MAC addresses and to provide an indication that the MAC addresses are reachable through the particular PE router that is issuing the route advertisement. In the EVPN implemented using PE routers 10 for a given EVI, each of PE routers 10 advertises the locally learned MAC addresses to other PE routers 10 using a BGP route advertisement, also referred to herein as a "MAC route" or a "MAC Advertisement route." As further described below, a MAC route typically specifies an individual MAC address of customer equipment 4 along with additional forwarding information, such as a route descriptor, route target, layer 2 segment identifier, MPLS label, etc. In this way, PE routers 10 use BGP to advertise and share the MAC addresses learned when forwarding layer two communications associated with the EVPN.

In this way, PE routers 10 may perform both local learning and remote learning of MAC addresses. Each of PE routers 10 (e.g., PE router 10D) utilizes MAC routes specifying the MAC addresses learned by other PE routers to determine how to forward L2 communications to MAC addresses that belong customer equipment 4 connected to other PEs, i.e., to remote CE routers and/or customer equipment behind CE routers operatively coupled to PE routers. That is, each of PE routers 10 determine whether Ethernet frames can be sent directly to a particular one of the other PE routers 10 or whether to treat the Ethernet frames as so called "BUM" traffic (Broadcast, Unidentified Unicast or Multicast traffic) that is to be flooded within the EVPN based on the MAC addresses learning information received from the other PE routers.

As shown in FIG. 1, CE routers 8 may be multi- and/or singly-homed to one or more of PE routers 10. In EVPN, a CE router may be said to be multi-homed when it is coupled to two physically different PE routers on the same EVI when the PE routers are resident on the same physical Ethernet Segment. As one example, CE router 8B is coupled to PE routers 10A, 10B, 10C via links 16D, 16E, and 16F, respectively, where PE routers 10A, 10B, and 10C are capable of providing access to EVPN for L2 customer network 6B via CE router 8B. In instances where a given customer network (such as customer network 6B) may couple to service provider network 12 via two different and, to a certain extent, redundant links, the customer network may be referred to as being "multi-homed." In this example, CE router 8B may be multi-homed to PE routers 10A, 10B, and 10C because CE router 8B is coupled to three different PE routers 10A, 10B, and 10C via separate and, to a certain extent, redundant links 16D, 16E, and 16F, where both of PE routers 10A, 10B, and 10C are capable of providing access to EVPN for L2 customer network 6B. Multi-homed networks are often employed by network operators so as to improve access to EVPN provided by service provider network 12 should a failure in one of links 16D, 16E, and 16F occur.

In a typical EVPN configuration, only the multi-homing PEs 10A-10C participate in DF election for each ESI. PE 10D not connected to the ESI has no direct knowledge of the DF election result for a give ESI. In single-active situations, remote PE 10D is typically configured to install the MAC routes for the ESI with an active and backup path when possible. Existing EVPN protocols allow for the possibility of a backup path only in the special case when there are exactly two multi-homing PEs attached to the ESI for a particular EVPN instance. If there are three or more multi-homing PEs, as in the example of FIG. 1, remote PE 10D will receive multiple Ethernet A-D routes per each EVI and will be unable to infer which of the PEs advertising the Ethernet A-D per EVI routes should be treated as the backup to the primary PE. Using conventional protocols, if the primary PE 10A-10C for a given EVI encounters a failure and withdraws the Ethernet A-D per ESI route, remote PE 10D will be forced to begin flooding traffic for the associated set of MAC addresses 17 to all pseuodowires 17 because the remote PE will not have awareness of which remaining multi-homing PEs 10A-10C will become the new primary PE for the ESI.

Moreover, for the case when a new multi-homing PE is added to the multi-homed ESI due to an event such as the access-side link coming up, there could be a transient period of time during which more than one PE is playing the role of DF for the EVI. During this transient period, MAC advertisements could be received from both the new primary PE and the former primary PE, leading to heavy overhead in the processing of MAC advertisements by the remote PE 10D.

In both of the above example scenarios, according to conventional protocols, remote PE 10D would be forced to rely on the arrival of individual MAC routes from the new primary PE and withdrawal of MAC routes from the former primary PE to update its forwarding state. As such, convergence time grows linearly as a function of the number of MAC addresses which need to have their nexthops repaired or otherwise updated by remote PE 10D despite the fact that the MAC addresses for the particular EVI share the same fate by virtue of being advertised from the same ESI. Because the number of MAC routes having nexthops that must to be repaired can typically be on the order of thousands (or more), the convergence time of the network can be significant and unpredictable.

Techniques described herein extend the EVPN protocol signaling mechanisms so that the multi-homing PEs 10A-10C can definitively convey their primary/backup status to remote PE 10D. In one example, this is accomplished by attaching a new extended community to the Ethernet A-D per EVI routes advertised by the multi-homing PEs to specifically carry the advertising PE's primary or backup status. Withdrawal of an Ethernet AD route by a former primary one of PEs 10A-10C causes remote PE10D to update all MAC addresses associated with the EVI.

For example, as described herein, the EVPN protocol executing on PE router 10D associates MACs learned for a given ESI, EVI with a single, shared "next hop," where the next hop logically identifies the one of PEs 10A-10C operating as the DF to which traffic from customer network 6A is to be forwarded for delivery to customer network 6B. In other words, the EVPN protocol executing on PE router 10D defines a shared next hop in its control plane, logically groups the MACs for the {ESI, EVI} and associates them with the shared next hop. Withdrawal of the AD route by the current primary DF for the {ESI, EVI} causes PE 10D to repair the MACs by identifying the one of PE routers 10A-10C affirmatively elected as backup DF and then modifying the shared next hop for {ESI,EVI} without having to wait for MAC routes updates to adjust the next hops for each individual MAC address. As such, update of next hop information associated with L2 network address stored by remote PE 10D in response to failover from a primary DF to a backup DF for Ethernet segment 14 can occur in constant time and, as such, is not a function of the number of MAC addresses to be updated.

Figure 2:
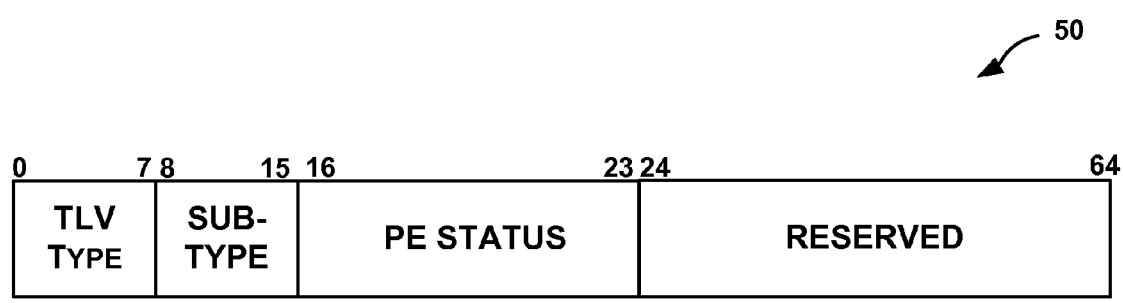
FIG. 2 shows an example format of an EVPN MH PE Status extended community data structure to be embedded within BGP Ethernet A-D routes.

FIG. 2 shows an example format of an EVPN MH PE Status extended community data structure 50 to be embedded within BGP Ethernet A-D route advertised by each multi-homed PE router of an Ethernet segment for each EVI. In the example of FIG. 2, the low-order bit of the PE status octet is defined as the Primary PE bit. The second lowest order bit is defined as the Backup PE bit.

In accordance with the techniques described herein, multi-homing PEs 10A-10C advertise the Ethernet A-D per EVI route with an attached EVPN MH PE Status extended community 50 when they have connectivity to the {ESI, EVI} pair. The multi-homing PE which is elected as the DF for a given {ESI, EVI} sets the Primary PE bit in the PE status field to 1 in the EVPN MH PE Status extended community while leaving all other bits in the PE status field set to 0.

After determining the initial DF (i.e., primary DF) for an {ESI, EVI} combination, each multi-homing PE connected to the ESI and participating in the EVI will run a subsequent DF election algorithm. The second DF election is performed with the primary DF that was just elected being removed from the DF candidate list. Effectively, the second run of the DF election algorithm with the primary DF removed will determine which PE is the preferred backup PE to the primary PE. When outputting the Ethernet A-D route for the {ESI, EVI} pair, the PE identified as the backup to the primary PE for the {ESI, EVI} pair will set the Backup PE bit in the PE status field to 1 in the EVPN MH PE Status extended community while leaving all other bits in the PE status field set to 0. In some examples, all remaining multi-homing PEs which are neither the primary PE nor backup PE will leave all bits in the PE status field of the EVPN MH PE Status extended community set to 0 in their advertisements. In other examples, these techniques may be easily extended to elect and definitively convey a secondary backup DF, a tertiary backup DF and so on.

When remote PE 10D receives the Ethernet A-D per EVI routes with the attached EVPN MH PE Status extended community from multi-homing PEs 10A-10C, the remote PE utilizes the Primary PE and Backup PE bits carried by the community to identify which multi-homing PE is the primary PE and which is the backup PE for each EVI. This technique applies regardless of the number of multi-homing PEs because remote PEs will have a specific indicator of which PE to use as the backup path should the primary PE fail. When the primary PE detects a failure and withdraws the Ethernet A-D per ESI route, remote PE 10D will be able to immediately repair all MACs associated with the {ESI, EVI} so they use the backup PE nexthop without necessarily needing to wait for MAC address routes updating the MAC addresses of the EVPN.

Additionally, the advertisement of the Ethernet A-D per EVI route by the primary PE with the Primary PE bit set allows remote PEs to immediately update the forwarding state for all MACs associated with the {ESI, EVI} in constant time when a newly introduced multi-homing PE becomes the DF/primary PE without relying on individual MAC advertisements to update the forwarding state on a MAC by MAC basis. This mechanism may have significant advantages over conventional procedures whose performance degrades linearly with scale and is prone to flooding.

Figure 3:
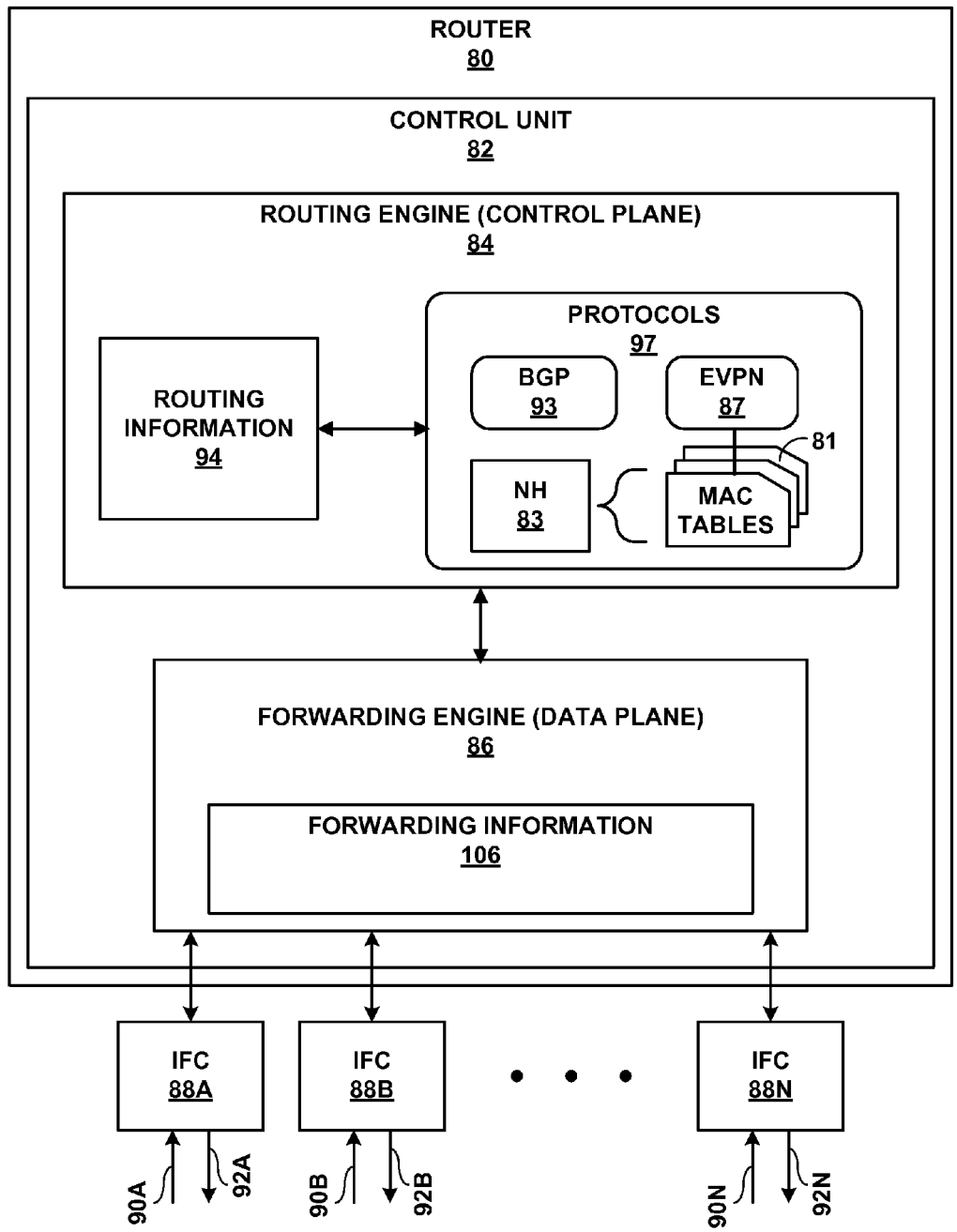
FIG. 3 is a block diagram illustrating further details of an example router in accordance with techniques of the disclosure.

FIG. 3 is a block diagram illustrating an exemplary router 80 capable of performing the disclosed techniques. In general, router 80 may operate substantially similar to PEs 10 of FIG. 1.

In this example, router 80 includes interface cards 88A-88N ("IFCs 88") that receive packets via incoming links 90A-90N ("incoming links 90") and send packets via outbound links 92A-92N ("outbound links 92"). IFCs 88 are typically coupled to links 90, 92 via a number of interface ports. Router 80 also includes a control unit 82 that determines routes of received packets and forwards the packets accordingly via IFCs 88.

Control unit 82 may comprise a routing engine 84 and a packet forwarding engine 86. Routing engine 84 operates as the control plane for router 80 and includes an operating system that provides a multi-tasking operating environment for execution of a number of concurrent processes. Routing engine 84, for example, execute software instructions to implement one or more control plane networking protocols 97. For example, protocols 97 may include one or more routing protocols, such as Border Gateway Protocol (BGP) 99, for exchanging routing information with other routing devices and for updating routing information 94. Routing information 94 may describe a topology of the computer network in which router 80 resides, and may also include routes through the shared trees in the computer network. Routing information 94 describes various routes within the computer network, and the appropriate next hops for each route, i.e., the neighboring routing devices along each of the routes. Routing engine 84 analyzes stored routing information 94 and generates forwarding information 106 for forwarding engine 86. Forwarding information 106 may associate, for example, network destinations for certain multicast groups with specific next hops and corresponding IFCs 88 and physical output ports for output links 92. Forwarding information 106 may be a radix tree programmed into dedicated forwarding chips, a series of tables, a complex database, a link list, a radix tree, a database, a flat file, or various other data structures.

In addition, routing engine 84 executes EVPN protocol 87, which operates to communicate with other routers to establish and maintain an EVPN, such as the EVPN of FIG. 1, for transporting L2 communications through an intermediate network so as to logically extend an Ethernet network through the intermediate network. EVPN protocol 87 may, for example, communicate with EVPN protocols executing on remote routers to establish pseudowires for the EVPN and maintain MAC address tables 50 associating L2 customer MAC addresses with specific pseudowires. When implementing an EVPN, L2 MAC learning may be performed in the control plane by exchanging, with remote PE devices, BGP messages containing customer MAC addresses. EVPN protocol 87 communicates information recorded in MAC tables 81 to forwarding engine 86 so as to configure forwarding information 56. In this way, forwarding engine 30A may be programmed with associations between each PW and output interface and specific source customer MAC addresses reachable via those PWs. Additional example information with respect to the EVPN protocol is described in "BGP MPLS Based Ethernet VPN," draft-ietf-l2vpn-evpn-11, Internet Engineering Task Force (IETF), Jul. 2, 2014, the entire contents of which are incorporated herein by reference.

In example embodiments, BGP 93 and EVPN 87 operate in accordance with the techniques described herein so as to advertise and/or receive Ethernet A-D per EVI routes that have been enhanced to carry the EVPN MH PE Status extended community data structure described herein. That is, responsive to instructions from EVPN protocol 87, BGP protocol 93 generates for output BGP Ethernet A-D per EVI routes specifying primary PE DF and backup DF for each {ESI, EVI}. Moreover, BGP 93 may similarly be configured to receive BGP Ethernet A-D per EVI routes specifying such information, and may extract such information and convey the elections to EVPN 87.

EVPN protocol 87 associates MACs learned for a given ESI, EVI with a corresponding shared "next hop" 83. Next hop 83 specifies the one of PEs 10A-10C operating as the DF to which traffic from customer network 6A is to be forwarded for delivery to customer network 6B. In other words, EVPN protocol 87 executing on PE router 10D defines shared next hop 84 for a given {ESI, EVI}, logically groups the MACs for the {ESI, EVI} and associates them with the shared next hop. Moreover, next hop 83 may specify an IP addresses associated with the DF and may further specify encapsulation information for reaching the DF through the corresponding pseudowire. Withdrawal of the AD route by the current primary DF for the {ESI, EVI} causes router 80 to repair the MACs by identifying the PE router for the {ESI, EVI} that was affirmatively elected as backup DF for the {ESI, EVI} and then modifying shared next hop 83 for the {ESI,EVI}. In this way, router 80 need not necessarily wait for individual MAC routes updates to adjust the next hops for each individual MAC address within MAC tables 81. As such, update of next hop information associated with L2 network address stored by a remote PE in response to failover from a primary DF to a backup DF for and {ESI, EVI} can occur in constant time and, as such, is not a function of the number of MAC addresses to be updated.

As such, responsive to withdrawal of an BGP Ethernet A-D per EVI route, a remote PE router may immediately update the forwarding state for all MACs associated with the {ESI, EVI} in constant time when a different multi-homing PE becomes the DF primary PE for the {ESI, EVI} without relying or otherwise waiting for individual MAC advertisements to update the forwarding state on a MAC-by-MAC basis.

The architecture of router 80 illustrated in FIG. 3 is shown for exemplary purposes only. The invention is not limited to this architecture. In other examples, router 80 may be configured in a variety of ways. In one example, some of the functionally of control unit 82 may be distributed within IFCs 88. In another example, control unit 82 may comprise a plurality of packet forwarding engines operated as slave routers.

Control unit 82 may be implemented solely in software, or hardware, or may be implemented as a combination of software, hardware, or firmware. For example, control unit 82 may include one or more processors which execute software instructions. In that case, the various software modules of control unit 82 may comprise executable instructions stored on a computer-readable medium, such as computer memory or hard disk.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Figure 4:
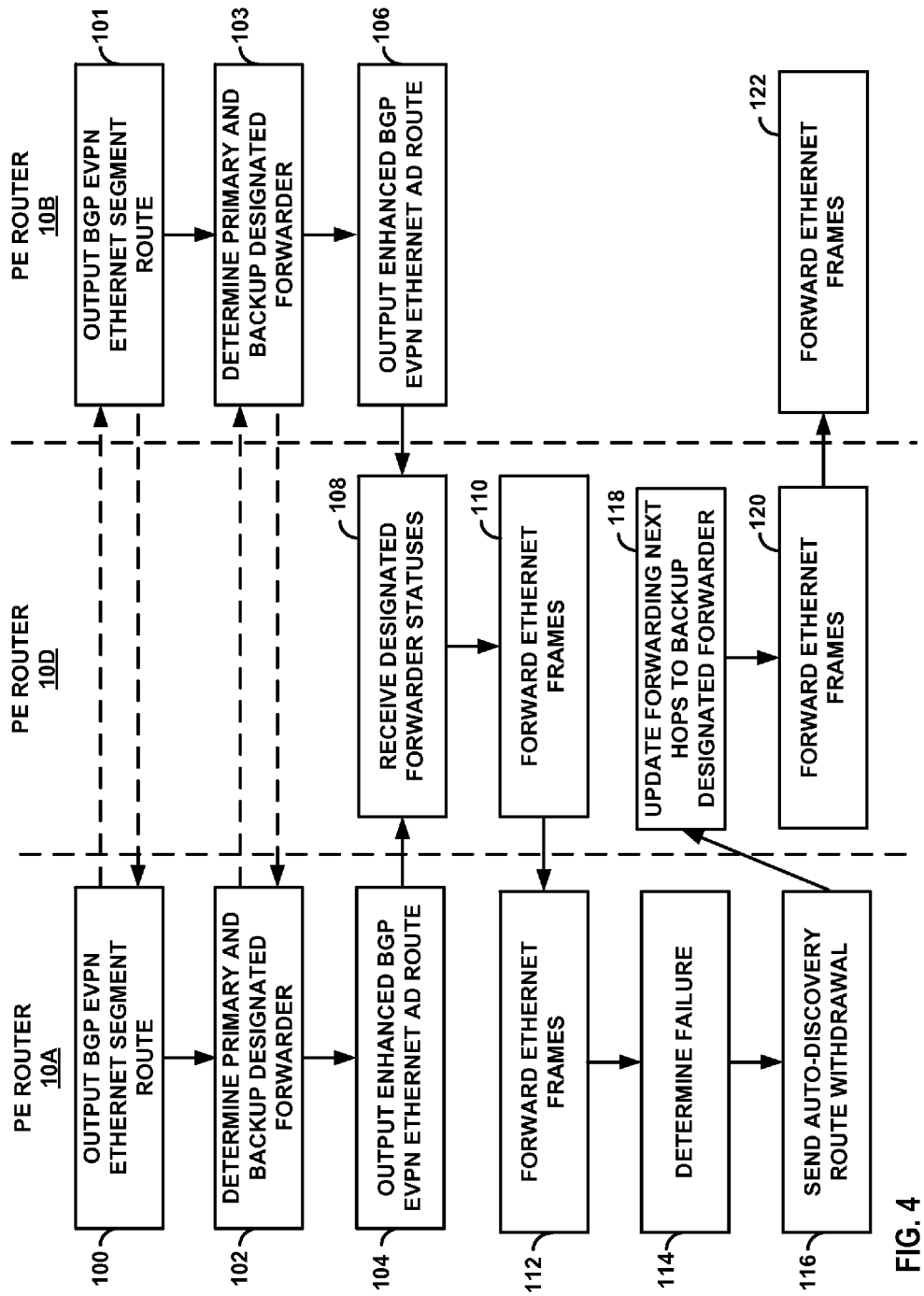
FIG. 4 is a flowchart illustrating example operations of multiple network devices in accordance with techniques of the disclosure.

FIG. 4 is a flowchart illustrating example operations of multiple network devices in accordance with techniques of the disclosure. Example operations in accordance with techniques of the disclosure are illustrated for example purposes with respect to PE routers 10A-10D for a given EVI of one or more EVIs of Ethernet segment 14. For simplicity, operation of other routers of the Ethernet segment, such as PE router 10C, is not shown in FIG. 4, although such operation may be similar to PE routers 10A, 10B.

As shown in FIG. 4, the PE routers of the Ethernet segment, e.g., PE routers 10A, 10B of Ethernet segment 14, may, at initial configuration and startup, output BGP EVPN Ethernet Segment routes specifying an Ethernet Segment Identifier (ESI) (100,101). In response, the PE routers elect a primary designated forwarder and a backup designated forwarder for each {ESI, EVI } pair (102, 103). For example, after determining the initial DF for a given {ESI, EVI} combination, each multi-homing PE connected to the ESI and participating in the EVI will run another DF election algorithm having the true DF that was just elected being removed from the DF candidate list. Effectively, the second run of the DF election algorithm with the true DF removed will determine which PE is the preferred backup PE to the primary PE. In this way, each of the PE routers in Ethernet segment 14 as shown in FIG. 1 determine the same ordering of primary and backup designated forwarders.

In accordance with one example of the techniques described herein, each multi-homing PEs constructs and outputs, for each EVI, an Ethernet AD route with an attached EVPN MH PE Status extended community 50 (FIG. 2) that affirmatively indicates whether the advertising router has been elected either a primary or a backup DF for the ESI, EVI (104, 106). For example, having been elected a primary DF, PE router 10A may output the enhanced Ethernet AD route with the Primary PE bit in the PE status field set to 1 in the EVPN MH PE Status extended community while leaving all other bits in the PE status field set to 0. Having been elected a backup DF, PE router 10B may output the enhanced Ethernet AD route with the Backup PE bit in the PE status field set to 1 in the EVPN MH PE Status extended community while leaving all other bits in the PE status field set to 0.

A remote PE of the EVPN, e.g., PE router 10D, receives the Ethernet AD routes from PE router 10A and PE router 10B, respectively and configures its routing and forwarding information to forward Ethernet frames in Ethernet segment 14 using the designated forwarder specified as PE router 10A (108). PE router 10D may also configure its forwarding information to use PE router 10B as the designated forwarder in the event of a network failure at PE router 10A.

As described herein, PE router 10D defines a shared next hop for the {ESI, EVI}, logically groups the MACs for the {ESI, EVI} and associates them with the shared next hop.

PE router 10D may forward Ethernet frames in single-active mode in accordance with the configured forwarding information that reflects the predetermination and indication of the primary designated forwarder and the backup designated forwarder (110). For example, based on the indication of the primary DF and the backup DF for the EVPN, routing engine 84 of PE router 10D may to install forwarding information 106 within forwarding engine 86 to specify both primary next hops and backup next hops for MAC addresses learned for the customer network. PE router 10A forwards the Ethernet frames received from PE router 10D and CE router 8B as the primary designated forwarder in single-active mode for Ethernet segment 14 (112). Further example details of installation of primary and secondary next hops within a forwarding engine of a router are described in U.S. Pat. No. 7,990,993 entitled "PLATFORM-INDEPENDENT CONTROL PLANE AND LOWER-LEVEL DERIVATION OF FORWARDING STRUCTURES" and U.S. Pat. No. 8,917,729, entitled "FAST REROUTE FOR MULTIPLE LABEL SWITCHED PATHS SHARING A SINGLE INTERFACE," each of which are incorporated herein by reference.

During operation, PE routers 10A, 10B inform remote PE router 10B of MAC addresses associated with customer network equipment. At some point, PE router 10A may detect a network failure and send an Ethernet AD route withdrawal message to PE router 10D (114, 116). In response, PE router 10D may immediately update internal forward state to repair all MACs associated with the {ESI, EVI} so traffic destined for the MAC addresses use the backup PE nexthops without waiting to receive MAC address routes updating the MAC addresses of the EVPN (118). For example, PE router 10D may update shared next hop 83 associated with the overall collection of MACs for the {ESI, EVI} without waiting for individual MAC updates. PE router 10D then updates forwarding information 106 within forwarding engine 86.

Consequently, in response to the failure, PE router 10D forwards Ethernet frames to CE router 8B using PE router 10B in Ethernet segment 14 as the DF, in this example (120). Upon receiving such Ethernet frames, PE router 10B forwards the Ethernet frames to PE CE router 8B (122). As shown in FIG. 4, techniques of the disclosure enable PE router 10D to seamlessly and quickly forward Ethernet frames to PE router 10B as the designated forward in the event of a link failure. As such, as described herein, update of L2 network address by remote PE 10D in response to failover from a primary DF to a backup DF for Ethernet segment 14 can occur in constant time and, as such, need not be a function of the number of MAC addresses to be updated.

Various embodiments of the invention have been described. These and other embodiments are within the scope of the following claims.

The invention claimed is:

1. A method comprising:
    participating, with one of a plurality of multi-homed provider edge (PE) routers that provide an active-standby configuration for an Ethernet segment coupling the PE routers to a customer network, in a designated forwarder (DF) election of the PE routers for the Ethernet segment; and
    upon election of one of the multi-homed PE routers as a primary DF for the Ethernet segment, sending, with the one of the multi-homed PE routers, a first control plane routing protocol message to a remote PE router operating with the multi-homed PE routers to form an Ethernet Virtual Private Network (EVPN), wherein the first control plane routing protocol message includes an indicator that the one of the multi-homed PE routers is the primary DF in the Ethernet segment.

2. The method of claim 1, further comprising, upon failure to be elected as the primary DF:
    participating, with the multi-homed PE routers, in a backup DF election of the multi-homed PE routers for the Ethernet segment, wherein the backup DF election excludes the one of the multi-homed PE routers that was elected DF for the Ethernet segment; and
    upon election as the backup DF for the Ethernet segment, sending, with the one of the multi-homed PE routers, a second control plane routing protocol message to the remote PE router, wherein the second control plane routing protocol message includes an indicator that the one of the multi-homed PE routers sending the second control plane message has affirmatively been selected as a backup designated forwarder in the Ethernet segment.

3. The method of claim 2, wherein the first control plane routing protocol message and the second control plane routing protocol message each comprise an Ethernet A-D route communicated by a Border Gateway Protocol (BGP) protocol and each include an EVPN Multi-Homed (MH) Provider Edge (PE) Status extended community for the Ethernet A-D route to specifically identify the primary DF or backup DF status for the sending PE.

4. The method of claim 2 further comprising updating, in accordance with the DF election and backup DF election received via the first and second control plane routing protocol messages and with the remote PE router, the forwarding state for all MACs associated with a combination of the Ethernet Segment and EVPN in constant time without relying on individual MAC advertisements to update the forwarding state on a MAC-by-MAC basis.

5. A router comprising:
    a processor configured to execute a Border Gateway Protocol (BGP) and an Ethernet Virtual Private Network (EVPN) protocol to configure the router to participate as one of a plurality of multi-homed provider edge (PE) routers that provide an active-standby configuration for an Ethernet segment coupling the multi-homed PE routers to a customer network,
    wherein the processor is configured to implement the EVPN protocol to perform a designated forwarder (DF) election of the multi-homed PE routers for the Ethernet segment,
    wherein, upon election as the DF for the Ethernet segment, the processor sends a first control plane routing protocol message to a remote PE router, and
    wherein the first control plane routing protocol message includes an Ethernet A-D route communicated by the BGP protocol and includes an EVPN Multi-Homed (MH) Provider Edge (PE) Status extended community for the Ethernet A-D route to specifically identify the router as the primary DF.

6. A non-transitory computer-readable storage medium having stored thereon instructions that, when executed, cause one or more processors to:
    participate, with one of a plurality of multi-homed provider edge (PE) routers that provide an active-standby configuration for an Ethernet segment coupling the PE routers to a customer network, in a designated forwarder (DF) election of the PE routers for the Ethernet segment; and upon election as the DF for the Ethernet segment, send, with the one of the multi-homed PE routers, a first control plane routing protocol message to a remote PE router, wherein the first control plane routing protocol message includes an indicator that the PE router is a designated forwarder in the Ethernet segment, wherein the first control plane routing protocol message comprises an Ethernet A-D route communicated by a Border Gateway Protocol (BGP) protocol and includes an EVPN MH PE Status extended community for the Ethernet A-D route to specifically identify the primary DF status for the sending PE.

7. A method comprising:

receiving, with a remote router coupled by an intermediate network to a plurality of multi-homed provider edge (PE) routers that provide an active-standby configuration for an Ethernet segment coupling the PE routers to a customer network, a first control plane routing protocol message, wherein the first control plane routing protocol message includes an indicator that a first one of the plurality of PE routers has affirmatively been selected as a primary designated forwarder (DF) in the Ethernet segment coupled to an Ethernet Virtual Private Network (EVPN);

receiving, with the remote router, a second control plane routing protocol message, wherein the second control plane routing protocol message includes an indicator that a second one of the plurality of PE routers has affirmatively been selected as a backup designated forwarder (DF) for the Ethernet Segment; and updating, in response to a control plane message withdrawing the primary DF from the EVPN, the shared next hop to direct network traffic for all MACs associated with the EVPN to the backup DF without waiting to receive individual MAC routes updating next hops for the MAC addresses of the EVPN on a MAC-by-MAC basis.

8. The method of claim 7, wherein the first control plane routing protocol message and the second control plane routing protocol message each comprise an Ethernet A-D route communicated by the BGP protocol and each include an EVPN MH PE Status extended community for the Ethernet A-D route to specifically identify a primary DF or backup DF status for the sending PE.

9. A router comprising:

a processor configured to execute a Border Gateway Protocol (BGP) and an Ethernet Virtual Private Network (EVPN) protocol to configure the router to participate within an EVPN as a remote router coupled by an intermediate network to a plurality of multi-homed provider edge (PE) routers that provide an active-standby connectivity to a customer network, wherein the BGP protocol executing on the processor receives a first control plane routing protocol message that includes an indicator that a first one of the plurality of PE routers has affirmatively been selected as a primary designated forwarder (DF) in the Ethernet segment and a second control plane routing protocol message that includes an indicator that a second one of the plurality of PE routers has affirmatively been selected as a backup DF in the Ethernet segment, wherein, in response to receiving MAC routes for the EVPN, the EVPN protocol executing on the processor is configured to associating MAC addresses advertised by the MAC routes with a shared next hop within the remote router, and wherein the processor is configured to update, in response to a control plane message withdrawing the primary DF from the EVPN, the shared next hop to direct network traffic for all MACs associated with the EVPN to the backup DF without waiting to receive individual MAC routes updating next hops for the MAC addresses of the EVPN on a MAC-by-MAC basis.

10. The method of claim 9, wherein the first control plane routing protocol message and the second control plane routing protocol message each comprise an Ethernet A-D route communicated by the BGP protocol and each include an EVPN MH PE Status extended community for the Ethernet A-D route to specifically identify the sending PE as the primary DF or the backup DF.

* * * * *